United States Patent
Schlegel

(12) 
(10) Patent No.: US 6,513,238 B1
(45) Date of Patent: Feb. 4, 2003

(54) CONNECTING ROD WITH THERMALLY SPRAYED BEARING LAYER

(75) Inventor: Udo Schlegel, Vechelde (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 09/493,838

(22) Filed: Jan. 28, 2000

Related U.S. Application Data

(63) Continuation of application No. 09/033,874, filed on Mar. 3, 1998.

(30) Foreign Application Priority Data

Mar. 4, 1997 (DE) .......................................... 197 08 567

(51) Int. Cl.[7] ............................................. D21D 53/84
(52) U.S. Cl. ................. 29/888.09; 29/898.12; 29/898.13; 384/430; 384/469; 427/446; 427/455; 427/456; 427/327
(58) Field of Search .................. 29/888.09, 898.12, 29/898.13; 74/579 R, 579 E, 593, 594; 123/197.3; 384/430, 434, 469; 427/327, 328, 444, 446, 448, 453, 454, 455, 456; 451/38, 39, 57

(56) References Cited

U.S. PATENT DOCUMENTS

| 3,615,099 A | * | 10/1971 | Prasse |
| 4,123,122 A | * | 10/1978 | Gabrielson et al. |
| 4,523,365 A |   | 6/1985  | Richmond ................. 29/527.4 |
| 4,612,256 A | * | 9/1986  | Neuhauser et al. |
| 5,366,298 A |   | 11/1994 | Toshimitsu et al. ......... 384/107 |
| 5,458,984 A | * | 10/1995 | Negwer ..................... 428/448 |
| 5,548,984 A |   | 8/1996  | Miyatsu ....................... 70/276 |
| 5,551,782 A |   | 9/1996  | Arnhold et al. ............. 384/294 |
| 5,766,693 A | * | 6/1998  | Rao ........................... 427/456 |

FOREIGN PATENT DOCUMENTS

| GB | 1083003    |   | 9/1967  |
| GB | 1531222    |   | 11/1978 |
| JP | 61-006421  | * | 1/1986  |
| JP | 61-013017  | * | 1/1986  |
| JP | 01-120414  | * | 5/1989  |
| JP | 07-259839  | * | 10/1995 |
| WO | 9716578    |   | 5/1997  |

* cited by examiner

Primary Examiner—Gregory M. Vidovich
Assistant Examiner—Eric Compton
(74) Attorney, Agent, or Firm—Baker Botts LLP

(57) ABSTRACT

In the method for producing a connecting rod eye having a large eye with a cap described in the specification, a microporous aluminum bronze plasma-coating is applied to the large eye and the connecting rod eye is then opened by removing the cap, thus breaking the plasma coating. The cap is subsequently remounted and the bearing layer finished by fine spindling which produces micropores in the bearing surface for oil retention. Circumferential grooves are also provided in the bearing surface to improve oil retention.

36 Claims, 3 Drawing Sheets

CONNECTING ROD WITH THERMALLY SPRAYED BEARING LAYER

REFERENCE TO RELATED APPLICATIONS

This is a continuation of copending application Ser. No. 09/033,874 filed Mar. 3, 1998 and International application No. PCT/EP98/04497 filed Jul. 20 1998.

BACKGROUND OF THE INVENTION

This invention relates to methods for producing connecting rods having a thermally sprayed bearing layer and to connecting rods produced thereby.

Conventional connecting rods now in use, especially for internal combustion engines, are so-called cut or cracked connecting rods in which the large connecting rod eye that surrounds the crankshaft is cut or cracked to open it. As a rule, the small connecting rod eye does not need to be opened since it is connected to the piston by a straight bolt.

Depending upon the load applied to the bearing, connecting rod eyes are made with a variety of bearing shells providing the friction surface. In particular, supporting shell materials used in bearing shells are as a rule made of C 10 steel according to DIN 17210 or SAE 1010. Depending upon the particular design and application, the bearing shells may be cold hardened. The actual bearing surface layer, which may, for example, be white metal, leaded bronze, light metal, spatter coatings or the like depending upon the expected bearing load, may be applied to the supporting shell material. The bearing shells may be three-component, two-component or solid single component bearing shells. The shells are assembled to the connecting rod eye with an initial stress so that the bearing shells have a satisfactory, firm seat upon assembly.

Bearing shells not only constitute a substantial cost factor, but also complicate production and are a potential source of error. For example, the insertion of a bearing shell or bearing shell half may be overlooked in assembly, resulting in considerable engine damage.

SUMMARY OF THE INVENTION

Accordingly, it is an object of the present invention to provide a connecting rod with a thermally sprayed bearing, and a method of making it, which overcomes disadvantages of the prior art.

Another object of the present invention is to provide a connecting rod bearing producing excellent lubrication.

These and other objects of the invention are attained by thermally spraying bearing material onto the surface of a connecting rod eye to provide a bearing surface containing micropores or a groove. In a preferred embodiment one or more circumferential grooves are formed around the inner bearing surface.

Thus, according to the invention, a bearing shell is no longer inserted into a connecting rod eye, either the large eye, or alternatively into both connecting rod eyes. Instead, a bearing layer is applied directly to the connecting rod eye by thermal spraying such as by plasma spraying. Specifically, the connecting rods made in this way are used in an internal combustion engine to connect the crankshaft to the pistons. To increase the quantity of residual oil retained by the bearing layer, the applied bearing layer has micropores and/or one or more grooves.

Operationally reliable connecting rod bearings require a wear-resistant design and construction in order to transmit the bearing forces reliably and at permissible operating temperatures. Wear resistance is always provided when the sliding surfaces are separated from each other by a lubricating film such as an oil film that is capable of bearing a load. Such a lubricating film is maintained in friction bearings by a slightly eccentric shaft mounting. With this arrangement, the rotating shaft has a pumping effect that feeds the lubricant such as motor oil into the eccentric bearing slot, and oil pressure is built up at the convergent surfaces of the bearing slot. In other words, the lubricant is pressed into the narrowest cross section of the space between the bearing surfaces. This results in a condition called "interfacial lubrication" in which there is interfacial friction of the bearing material on the journal when the rotary motion of the shaft begins or is very slow. An increase in rotation speed causes the oil film to assist in supporting the journal even though a coherent oil film has not yet been built up. This is a condition called "mixed friction," i.e., simultaneous interfacial and floating friction. This condition exists chiefly when an engine is being started and stopped. An additional increase in the speed of rotation causes the development of the hydrodynamically supporting lubricating film layer having a thickness equal to half of the bearing clearance resulting in a condition called "floating friction." With floating friction the bearing clearance is usually equal to about 15 $\mu$m to 60 $\mu$m.

When the surface of a connecting rod eye such as the large eye is plasma coated with an appropriate bearing material having micropores and/or a groove according to the invention, a high oil retention volume is obtained within the connecting rod bearing. As a result, friction and hence wear of the parts moving against each other, in particular during interfacial lubrication and mixed friction, are reduced. The oil retention volume is distinctly improved by the provision of at least one groove in the connecting rod bearing surface, the groove or grooves being preferably in the form of circumferential grooves. For an additional increase in oil retention capacity, the grooves are left at least largely unfinished, i.e., with their raw surface structure as produced.

In every bearing condition, regardless of the rotation speed and oil pressure, the microporous but pressure-stable structure of the sliding bearing surface, which preferably is machined, and the unfinished groove having a very rough surface structure cause a certain portion of oil to be stored in the bearing. This makes it possible for the bearing to pass through the conditions of interfacial and mixed friction more quickly even at a low crankshaft speed and hence reach the condition of nearly wear-free hydrodynamic lubrication rapidly. In other words, engine bearing performance characteristics during starting and slow-down of the engine are substantially improved so that higher bearing loads are possible with bearings having the same dimensions.

The invention has the following advantages: The bearing shells which were formerly customary in connecting rods to provide the sliding bearing surface are eliminated since, according to the invention, the bearing layer is applied directly to the connecting rod eye surface and not to an extra element inserted in the connecting rod eye. Hence, the necessity for assembly of bearing shells in the eye is also eliminated. Elimination of the bearing shells and of machining of the sliding bearing shell surface according to the invention results in a reduction of dimensional tolerance variations. There are three tolerances in conventional connecting rod bearings, the first tolerance being that of the crankshaft dimensions, while the second tolerance is determined by the dimensions of the bearing shells providing the sliding layer in the connecting rod and the third tolerance is determined by the dimensions of the connecting rod eye into which the bearing shell is inserted. As a result of coating and finishing of the bearing layer directly on the connecting rod eye surface according to the invention, the third tolerance is eliminated. In addition, according to the invention a greater thickness of connecting rod material is provided in the bolt region surrounding the eye since the bearing layer applied according to the invention is thinner than a bearing shell. This permits higher loads to be applied to the bearing of a connecting rod having the same external dimensions. The dimension of the third tolerance, i.e., the dimension of the connecting rod eye, may be sized very roughly in the present invention, since the eye is covered by the subsequent coating which is partially removed during formation of the sliding surface by, for example, fine spindling, to provide the second tolerance dimension.

According to the invention, the bearing layer is sprayed on so that it has a certain degree of porosity, at least at the bearing surface. This porosity is obtained by providing the bearing layer with micropores that are formed, for example, by oxide inclusions which are removed during finishing of the surface of the layer. The porosity of the bearing surface area is preferably between about 0.2% and about 6% and desirably between about 0.5% and about 4%. In addition, the micropores are preferably not interconnected, so that the pore volume of the micropores is constituted predominantly by closed pores. These micropores, which form a hydrodynamic micropressure chamber lubricating system, are opened up by, for example, the cutting operation of surface trimming, for example fine spindling of the bearing surface. As a result, the pores in the sliding bearing surface act as oil retention chambers so that, during startup or slowdown of the engine and at the beginning or termination of rotation of the crankshaft, a sufficient volume of oil is still available, presumably by adhesion of the motor oil in the micropores, for sliding film formation, i.e., floating friction, even though the oil pressure in the friction bearing has dropped or has not yet been built up. The duration of mixed friction operation during startup and slowdown is substantially shortened by the micropressure chamber system provided by the invention. The emergency operating characteristics of the bearing are also substantially improved without requiring the introduction of additional sliding bearing materials such as lead, tin or nickel alloys or the like. Advantageously, both the total pore area and the pore volume are determined during thermal spraying of the bearing materials according to the bearing load to be applied to the sliding surface. The major portion of the pore volume is constituted by pores of a size preferably in the range from 0.2 μm to 250 μm, desirably in a range from 1 μm to 50 μm.

The usual sequence of steps for the production of a bearing layer according to the invention is as follows: First the surface of the substrate to be coated, for example the large connecting rod eye, is cleaned, and especially freed from grease. This is carried out by applying superheated steam, for example. Then, the surface of the substrate is sandblasted, for example with $Al_2O_3$ powder. The discharge pressure is preferably about 3 to 8 bar and desirably about 4 to 6 bar, and the sandblasting is preferably carried out with successively different $Al_2O_3$ grain size ranges. In this connection, an increasing grain size is advantageously used, i.e., sandblasting is done first with a finer grain and subsequently with a coarser grain. Most preferably, at least three different grain size ranges are used. In this case, the grain sizes usually used are in a 15 to 250 mesh range, with 80 mesh and smaller, preferably 100 mesh to 230 mesh for the fine grain. For the medium-size grain, a size of 100 mesh or greater, preferably up to 40 mesh and desirably 80 mesh to 45 mesh, is used. For the coarse grain, a grain size of 45 mesh or greater and in particular 30 mesh or greater, preferably up to 16 mesh, i.e., 600 μm to 1.18 mm standard screen size, is used.

Using grains of different size ranges in sandblasting results in good surface roughness, even in the region of a notch, for example a breaking notch or a groove, producing a surface structure with an average peak-to-valley height $R_a$ of approx. 5 μm to 10 μm and in particular 6.5 μm to 8 μm in the smooth region, with an $R_z$ of approx. 35 μm to 60 μm and in particular 42 μm to 54 μm. Such roughnesses produced by sandblasting result in especially good adhesive strength of the thermally sprayed layer on the connecting rod.

Sandblasting is followed by plasma coating, for example using an AlCuFe (aluminum bronze) alloy powder. The thermally sprayed bearing layer preferably is produced with progressively increasing porosity, a layer having low porosity, for example, ≦2%, in particular ≦1%, being produced first. For the layer, a powder grain size of 38 μm (400 mesh), for example, is suitable. This first layer is produced with a thickness of approx. 100 μm to 300 μm, in particular 200 μm to 250 μm. Then a second layer having a porosity of approx. 2% to 6%, in particular 2.5% to 4%, is produced on the first layer by using a powder grain size of approx. 63 μm (230 mesh), for example. In this case, the powder grain size is chosen so that at least 40% by weight, preferably at least 50% by weight, of the powder is smaller than or equal to the specified screen size, and preferably at least 70% by weight, and desirably at least 80%, by weight falls within the next standard screen size, and preferably at least 90% by weight falls within twice the specified screen size, i.e., half the mesh size.

The layer thickness is preferably in the range from 150 μm to 800 μm, desirably in the range from 200 μm to 500 μm. When only one layer is formed, it is preferably in the range from 100 μm to 600 μm, desirably in the range from 200 μm to 400 μm, thick.

Application of the bearing layers preferably is effected in one operation, i.e., the coating sequence is not interrupted. To accomplish this, automatic powder and/or parameter adaptation is effected in order to obtain different porosities in the layers.

The lower bearing layer preferably covers the out-of-roundness which is typically about 30 μm to 150 μm that is produced for example by the cracking of the connecting rod upon breaking open of the bearing shell, and, to obtain a sufficient thickness for later finishing, the lower layer may be covered with one or more additional and, particularly, more porous, layers that can be applied to the bearing material of the connecting rod in a similar fashion. The upper layer or layers in turn can be removed without any major problem all the way down to the first slightly porous layer to produce the actual sliding bearing surface. This procedure results in an adjustment of the internal stress of the bearing layer, slight annealing of the connecting rod and high adhesive strengths of the sliding bearing layer, which commonly are ≧20 N/mm² and particular ≧25 N/mm². Adhesive strengths above 28 N/mm² are possible with this procedure. A layer hardness of, for example, approx. 185 $HV_{0.3}$ can be obtained using aluminum bronze for the bearing layer.

For more highly loaded sliding bearing layers in the connecting rod, particularly the large connecting rod eye, as are found especially in diesel engines, it is advantageous to increase the residual oil volume within the sliding bearing layer. This is effected according to the invention by increasing the oil retention volume at engine standstill or at an engine speed below idling speed by the providing one or more oil grooves in the sliding bearing layer. In this way, the region of mixed friction is traversed in a shorter time upon engine startup or slowdown. Such shorter time is a result of longer maintenance or more rapid formation of the sliding film, which results from adhesion of the motor oil in the micropores and the grooves or grooves in the surface facing the crankshaft. The introduction of at least one groove in the bearing layer, in particular in a bearing with a somewhat porous surface, results in the lubricating film being maintained for a longer time even though the oil pressure of the oil pump has already dropped or is just being built up. The effect of grooves is especially advantageous when the grooves extend predominantly circumferentially, i.e., completely around the inner bearing surface. In this way each groove is self-contained, i.e., is an endless groove and, in particular, an annular endless groove. The groove advantageously is V-shaped or trapezoidal in cross section, the sides of the groove extending at an angle to each other of preferably 30° to 80° and desirably 45° to 60°. A groove depth in the range of 0.2 mm to 1 mm and preferably 0.4 mm to 0.6 mm is suitable. The number of grooves depends mainly on the width of the friction bearing, the supporting portion of the bearing, and the required additional oil retention volume. The specified groove shape and depth preferably refer to the groove dimensions before application of a thermally sprayed coating. Plasma spraying is desirably used for applying the thermally sprayed coating.

Preferably after the formation of one or more grooves in the surface of the eye, the surface is coated with the bearing layer, in particular with the composite bearing layer having variable porosity which is described above. In subsequent finishing of the bearing surface the grooves preferably are finished only slightly or not at all since the rough plasma-applied layer structure produces especially good oil retention in the grooves.

In the application of the bearing layer, a metal powder is thermally sprayed and metal alloys are preferably used. In addition, a mixture of a variety of metals and preferably metal alloys is used. Such a mix may, for example, be a mixture of aluminum and tin, the mixture advantageously being obtained by mixing of the individual metal components in powder form.

The selection of the metal powder to be thermally sprayed depends, among other things, on the specific spray parameters and can easily be determined by a person skilled in the art by a series of tests. Advantageously bronzes, especially aluminum bronze (aluminum/tin), but alternatively copper bronze as well as metal-soft material layers and/or metal-solid lubricant layers, are employed as bearing materials. The soft materials used are, for example, soft metals, such as lead, which are distributed in a harder metal, such as an alloyed aluminum, for example, aluminum/copper/ magnesium/chromium. However, other soft materials, such as, for example, fluorocarbon polymers, e.g., polytetrafluorethylene, may alternatively be used. Compounds such as molybdenum disulfide, boron nitride and graphite, for example, are suitable as solid lubricants.

The bearing material is preferably sprayed in excess to produce a layer thicker than the desired thickness which is then mechanically finished. Honing is used for finishing, fine spindling in particular being suitable. In honing, 20 $\mu$m to 300 $\mu$m and preferably 50 $\mu$m to 200 $\mu$m of the bearing material preferably are removed. In fine spindling, the excess to be removed advantageously amounts to 50 $\mu$m to 1,000 $\mu$m and preferably 100 $\mu$m to 500 $\mu$m.

After removal of the excess, the finished bearing layer preferably has a thickness of 150 $\mu$m to 800 $\mu$m and desirably 200 $\mu$m to 500 $\mu$m. Such a layer is considerably thinner than conventional bearing shells, which have a thickness in the range of about 2.5 mm. This means that either the connecting rod material surrounding the eye can be thicker, permitting higher loading, or that the material surrounding the eye can have the same thickness and the connecting rod can be produced with a lower weight.

According to the invention, the connecting rod eye, which is coated with the bearing material by thermal spraying, is preferably opened only after application of the bearing material. This procedure is especially preferred when the connecting rod eye is broken open by cracking. In this process, the inside of the connecting rod eye is provided with a notch at each of the desired rupture locations. The notches preferably are made by a laser, for example an FK laser which is moved through the connecting rod eye at an angle to the bearing surface of approx. 45°. The laser power used is preferably 5 kW to 10 kW. The notch advantageously has a width of 0.3 mm to 0.8 mm and a depth of 0.2 mm to 0.7 mm. The rupture location usually is roughly centered in the connecting rod eye. Alternatively, the notch may also be produced by eroding or by a broach, for example, by ramming.

In notching and breaking the connecting rod eye, the sequence of operations preferably is effected so that first the connecting rod eye is notched, for example, with a tool, a laser or by eroding, then the bearing material is applied by thermal spraying, and subsequently, breaking is effected. This procedure eliminates or minimizes the slot that would otherwise exist at the rupture location or between the individual bearing parts. At a high engine load such a slot promotes detachment of the oil film. Better lubricating properties are thus obtained by notching before coating of the bearing material. Under some circumstances, breaking may take place before coating of the bearing material, which is broken again after coating, preferably without notching.

When the connecting rod eye is opened by being cut, this preferably takes place before application of the bearing layer by thermal spraying. In this procedure, the connecting rod eye is cut apart and the resulting surfaces of the remaining connecting rod and the connecting rod cap are individually broached smooth. The parts are then reassembled, provided with bolt bores and threads and bolted together. Preferably, a notch is also introduced at the parting plane of the surfaces in the connecting rod eye after it has been bolted back together again and before coating the surface of the eye with the bearing material. The connecting rod eye is preferably broken open again to break the bearing layer. If this break is too uneven, the bearing layer itself must be notched.

The honing or spindling treatment of the bearing layer described above is effected especially advantageously only after breaking of the connecting rod eye. In this way, any burrs produced upon rupture of the bearing layer at the rupture edge are removed simultaneously with removal of excess bearing material.

In the connecting rod produced according to the invention, an oil channel may if desired be introduced into the connecting rod eye. The oil channel is preferably bored into the connecting rod eye only after application of the bearing layer and in particular after its finishing. In this connection, the oil channel may alternatively be bored through the connecting rod to the facing connecting rod eye.

According to the invention, the large planar side surfaces of the connecting rod are preferably finished only after application of the bearing layer. In this case the finishing is preferably carried out by grinding of the planar surfaces.

In the method according to the invention, coating is preferably preceded by a step in which the connecting rod eye is roughened. This roughening is preferably effected by sandblasting, but blasting with a liquid under high pressure is alternatively possible. In this connection, the material of the eye such as C 70 steel, is preferably roughened to produce an average peak-to-valley height $R_a$ of 4 to 30 μm, desirably 8 μm to 12 μm. Such average peak-to-valley height values produce especially good adhesion of the bearing material to the material of the connecting rod eye.

For advantageous finishing of the bearing layer in the connecting rod eye, at least one of the plane side surfaces of the connecting rod eye is covered with a template that has an opening in the region of the eye. The template opening should be approximately the same size as the eye, so that, on the one hand, the coating of the bearing surface is not affected by the presence of the template and, on the other hand, coating of the bearing material on the planar side surfaces in the region of the connecting rod eye is largely avoided. If only one planar surface of a connecting rod is covered by the template, the other planar surface preferably lies on a pallet that also has an opening like that of the template in the region of the connecting rod eye.

The connecting rod eyes of several individual connecting rods are preferably coated in one operation according to the invention. To this end, a plurality of connecting rods, preferably two to ten and desirably four to eight are positioned against each other so that the connecting rod eyes to be coated form a continuous cylindrical opening. For this purpose, a holder into which the connecting rods can be inserted with their eyes aligned may be provided on a special pallet. The connecting rods which are coated at the same time in this process preferably are kept as a group so that they can subsequently be installed in the same internal combustion engine. All connecting rods for the same internal combustion engine preferably are coated together by such superposition. When this is not structurally possible because of the large number of cylinders, for example twelve cylinders, at least the connecting rods of one row of cylinders, for example, six cylinders in a V-12 engine, are superimposed for coating. This procedure ensures that connecting rods of like quality are installed in the same internal combustion engine.

In an especially preferred method, a gas stream is passed through the connecting rod eye during thermal spraying, particularly, when a plurality of superimposed connecting rods is coated. Air that is conditioned and purified provides a particularly suitable gas stream. The gas stream should desirably be free of grease and moisture and, insofar as possible, having a temperature maintained within a range of approx. 20° C. The gas stream preferably has a flow velocity, i.e., a downward flow rate, of about 3 m/s to 15 m/s and desirably 5 m/s to 8 m/s. Any overspray produced during thermal spraying is blown off by the gas stream.

Thermal spraying of the bearing material is preferably effected by using a rotating spray nozzle that is driven in a rotating manner through the connecting rod eye preferably starting from a location above the connecting rod eye. An especially uniform coating in a connecting rod eye is obtained by using such a spray nozzle. In coating the connecting rod eye according to the invention, the spray nozzle is advanced through the eye at a rate of preferably 0.5 mm/s to 20 mm/s, desirably 2 mm/s to 8 mm/s.

It is especially preferred that a plurality of layers, in particular four to thirty layers of the bearing material are applied to the connecting rod eye when the bearing layer is formed in the eye. The successive layers preferably are applied in opposite directions, which is effective to improve the layer quality. This is carried out by operating the spray nozzle to coat the surface of the connecting rod eye while running in and then running out while rotating that spray nozzle preferably in the same direction of rotation.

The connecting rods are coated with the bearing material in mass production according to the invention. In this case it is advantageous if at least a few connecting rods in each series are measured. In this connection, at least the peak-to-valley height $R_a$ and/or the uniformity of distribution of the bearing material when a mixture is used, should be measured. Especially preferably, measuring of the connecting rod is effected in a nondestructive manner.

The features and procedures mentioned above and in the following description are equally applicable to the method and to the connecting rods made according to the invention.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Only some of the steps of the method described hereinafter are necessarily linked. Basically, individual steps may be omitted, supplemented, carried out alternatively and/or replaced by others.

Production Sequence for Cracked Connecting Rod

Figure 2:
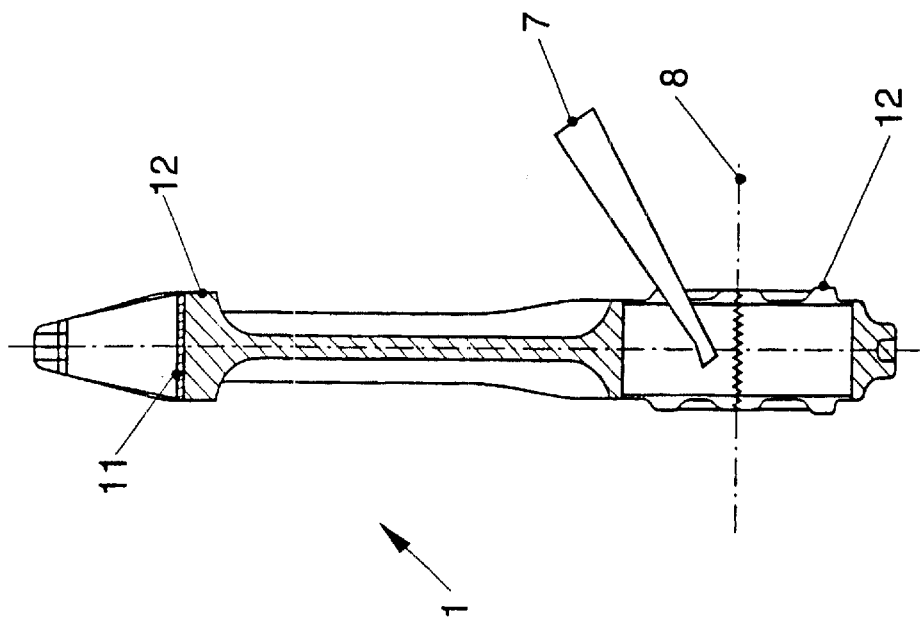
FIG. 2 is a side view showing laser notching of the large eye of the connecting rod shown in FIG. 1.
Figure 1:
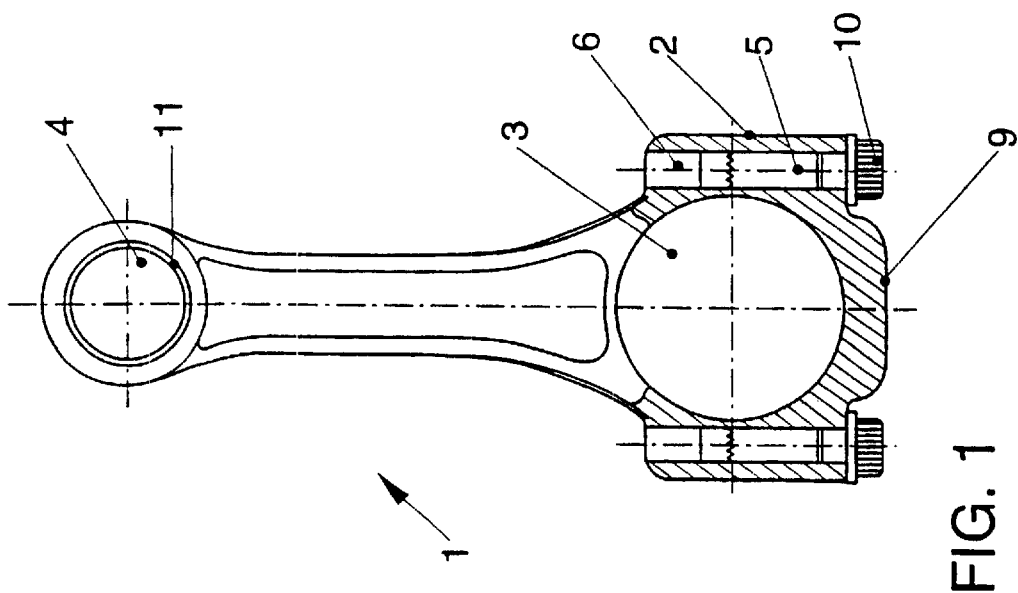
FIG. 1 is a front view, partly in section, showing a connecting rod.

The eyes of connecting rods such as shown in FIG. 1 have heretofore been conventionally provided with bearing shells, made, for example, of C 70 steel, on an assembly line. This is followed by rough-grinding of the side faces 2. Then the large and small connecting rod eyes 3 and 4 are premachined to the desired dimension. In addition, bolt holes for the connecting rod cap 9 are machined in the side faces 2 to produce bores 5 and threads 6.

To prepare the large eye 3 for cracking, an FK laser 7 is driven through the eye 3 at an angle of 45° burning a notch 8 having a width of approx. 0.5 mm and a depth of approx. 0.3 to 0.5 mm on both sides and in the center, respectively. The notch may alternatively be produced by a broach.

After the notches 8 have been made, the large connecting rod eye 3 is plasma coated, as described below, in accordance with the invention to produce a bearing layer having a thickness 15, shown in FIG. 3. After plasma deposition of the bearing layer in the large eye 3, the eye, together with the bearing layer, is cracked using a breaking device which applies a breaking force of about 100 kN. The region of the resulting rupture is cleaned by blowing it with compressed air and the broken-off connecting rod bearing cap 9 is reassembled to the connecting rod with bolts 10 using a specified torque. The small connecting rod eye is also completed by insertion of a bushing 11. After that the planar surfaces 12 are finish-ground.

Figure 3:
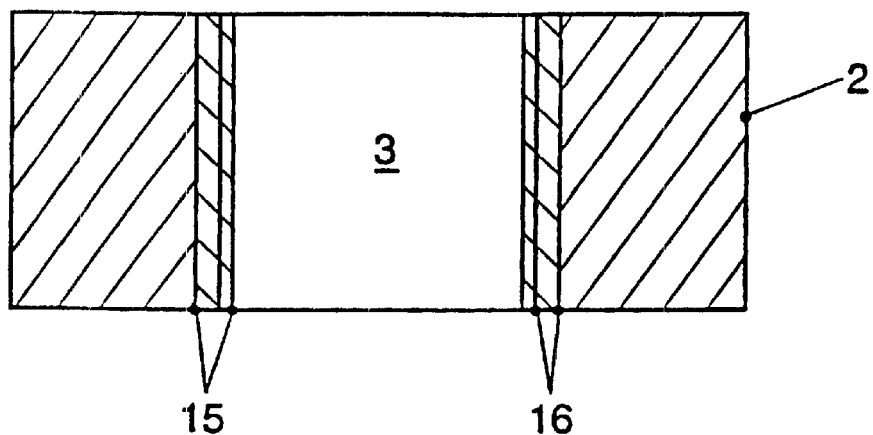
FIG. 3 is a cross-sectional view showing the bearing layer thickness of a thermally sprayed bearing layer in the large connecting rod eye.
Figure 4:
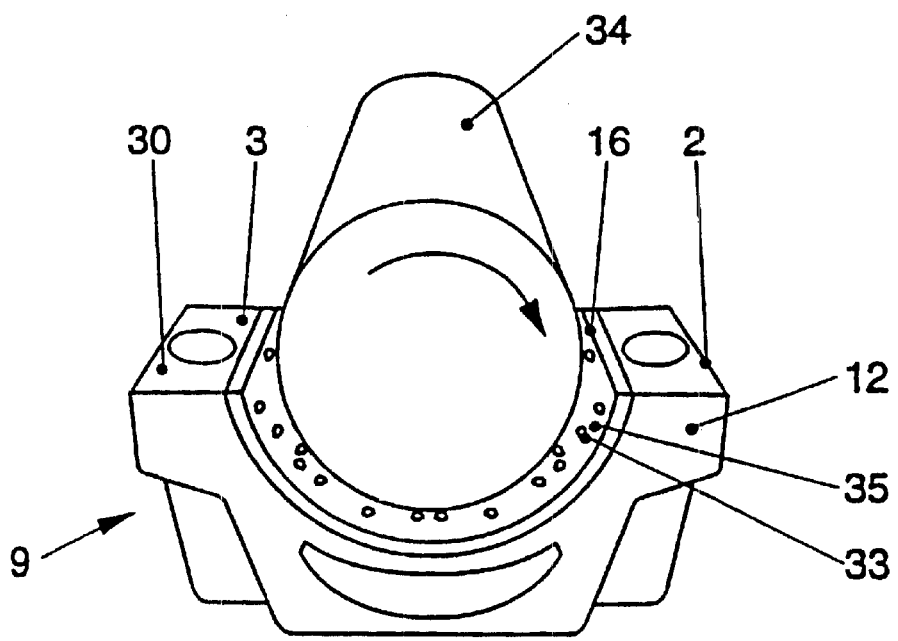
FIG. 4 is a perspective view showing a connecting rod cap with a crankshaft bearing pin and microporous bearing layer.
Figure 5:
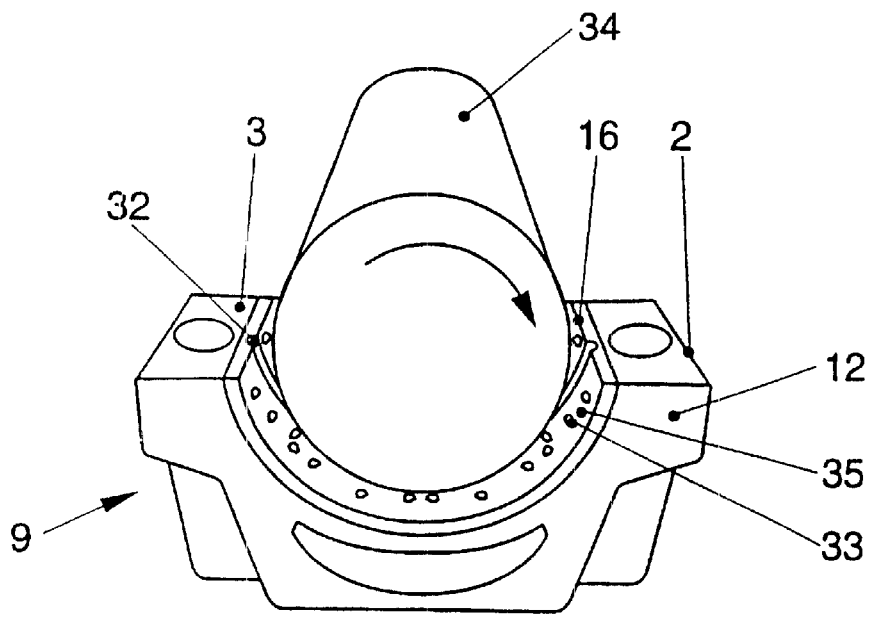
FIG. 5 is a view similar to FIG. 4 showing a connecting rod cap with a single circumferential oil groove.
Figure 6:
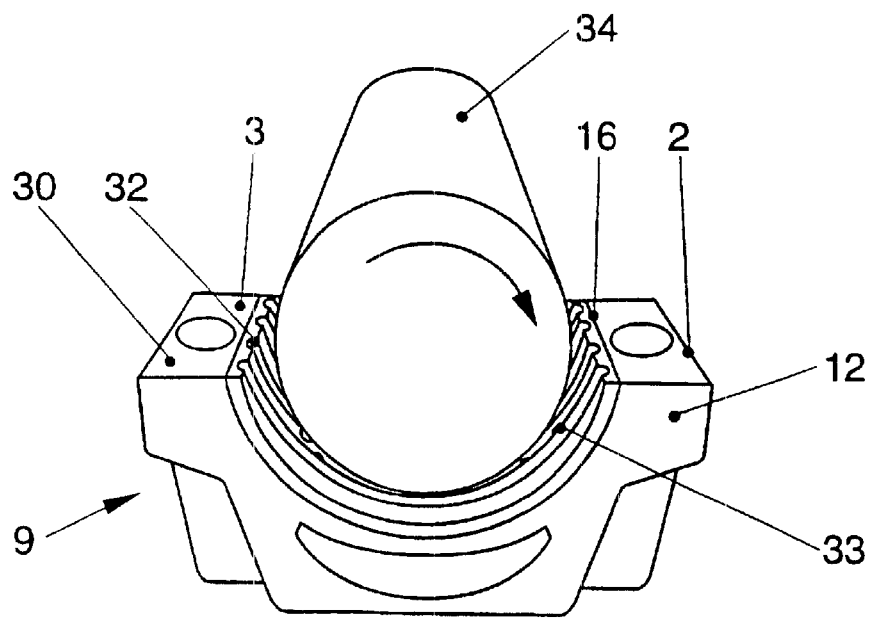
FIG. 6 is a view similar to FIG. 5 showing a connecting rod cap with a plurality of circumferential oil grooves.

The large eye 3, and optionally alternatively the small eye 4, are then machined to produce a desired dimension 16, shown in FIG. 3, by fine boring or fine spindling. Subsequently, the connecting rod is subjected to thorough cleaning, measured and classified.

Production Sequence for Cut Connecting Rod

The production sequence for a cut connecting rod is substantially the same as the sequence described above, but the connecting rod eye is separated into two parts by cutting it open after broaching of the side faces, the head faces and bolt supports. After the eye is cut open, the surfaces at the parting plane on the connecting rod and the connecting rod cap are individually broached. This is followed by a wash step, after which the small eye is premachined and finish-machined. The holes for the cap bolt are then introduced into the side faces by machining of bores and threads. The surfaces of the connecting rod and connecting rod cap at the parting plane are finish-ground and washed again and the cap is mounted by bolts on the connecting rod. The bearing surface is again notched along the split with an FK laser and then the large eye is coated with the bearing layer which subsequently is broken again.

Individual production steps, such as, for example, pressing of the bearing shell 11 into the small eye 4, may take place at various points in the sequence, for example, before plasma coating.

Production Sequence for Plasma Coating of the Large Connecting Rod Eye

For plasma coating, the connecting rods are washed and the large eye of the connecting rod is degreased with superheated steam, then dried so as to be essentially free from residual moisture. The connecting rods so pretreated are stacked over one another in sets of four to eight, so that the large eyes are concentric with a corresponding opening in a special pallet. The connecting rods are aligned and fixed on the pallet through the premachined small eye of the connecting rod and/or the side faces. The loaded pallets pass through a preparatory zone into a sandblasting unit, in which the large eye is roughed by sandblasting to an average peak-to-valley height $R_a$ of about 8 $\mu$m to 12 $\mu$m. Then, the connecting rods are moved into a cleaning station and the sandblasted surface blown off or blown out with compressed air. Lastly, the pretreated connecting rods move into a plasma station in which the large eye is coated with an aluminum bronze by a rotating plasma burner to produce a layer thickness 15 of about 0.5 mm as shown in FIG. 3. The coated connecting rods then go into a cooling zone, after which the cooled rods are removed from the pallet and delivered for the subsequent processing described above.

Connecting rods produced according to the invention have the advantage that they contain no bearing shell in the large eye. Consequently, assembly of the bearing shell itself, as well as the introduction of holding grooves or deburring of the bearing shells, is also eliminated. As a result, the formation of a bearing layer by plasma coating is competitive in terms of cost. In addition, reliability of assembly is increased in plasmacoated connecting rods, since bearing shells cannot be left out during assembly.

The connecting rods according to the invention have a greater thickness of the connecting rod material in the region of the bearing cap mounting since the plasma layer is only about 0.3 mm thick after finishing, whereas a bearing shell is 1.5 mm thick. Providing a greater thickness of connecting rod material permits a high connecting rod load for higher-loaded engines. Alternatively, maintaining the same thickness of connecting rod material permits a saving of weight. In addition, there is no slot between two bearing shell halves at which the oil film begins to detach in conventional bearings. The connecting rods according to the invention thus have improved lubricating properties.

Application Sequence

As described for the production sequences described above, cleaning of the surface to be coated and provided with radial grooves may be effected with superheated steam. In this way, practically 100% freedom from grease is obtained. Sandblasting of the substrate surface which is, for example, C 70 steel, is effected with $Al_2O_3$ providing at about 4 to 6 bar blasting pressure and using successively different grain sizes. For example, a first sandblasting operation for the eroded rupture notch in a cracked connecting rod or a split connecting rod is carried out using a grain diameter of 0.063 mm to 0.15 mm (230 to 100 mesh), a second sandblasting operation for the substrate surface and the circumferential groove is carried out with a grain diameter of 0.18 mm to 0.35 mm (80 to 45 mesh), and a third sandblasting operation for the substrate surface and the circumferential groove is carried out with grains having a diameter of 0.6 mm to 1.1 mm (30 to 16 mesh). This is followed by plasma coating with an aluminum-copper-iron alloy, for example, an aluminum bronze containing preferably 5% to 15% aluminum, 1% to 5% iron, 1% to 4% cobalt and 0.5% to 4% manganese, and desirably 9% to 12% aluminum, approx. 2% manganese, approx. 2% to 2.5% cobalt and approx. 3% to 4% iron. Initial plasma coating is effected to a layer thickness of about 200 $\mu$m to 250 $\mu$m with a powder grain size for the coating material having an average of about 38 $\mu$m and, using the application parameters which are dependent upon the burner employed in each instance, a coating porosity of $\leq 1\%$ is set. Coating is continued without interruption with a somewhat coarser powder grain having a diameter of approx. 65 $\mu$m, and a layer thickness of about 200 $\mu$m to 250 $\mu$m is formed. For this layer, the application parameters are set so that a porosity in the range of about 1.5% to 3.5% is obtained.

This kind of coating can also be provided for bearings without circumferential grooves.

Production Sequence for Cut Connecting Rods with Circumferential Grooves

The entire production sequence for cut connecting rods is described below but, as already mentioned, individual steps may be omitted, supplemented or replaced by other steps, depending upon production planning.

After delivery of the rough connecting rods, they are put on the assembly line where preliminary grinding and broaching of the planar side surfaces 12 takes place. Then the side faces 2, head faces and bolt supports are broached and the large connecting rod eye is separated. This is followed by broaching of the surfaces of the parting plane in the large eye 3, the connecting rod and the cap 9 being worked individually. After the parts are washed, the small eye 4 is preworked and finish-machined and the bores and thread are cut for the connecting rod cap bolts 10. The bearing bushing 11 is inserted into the small eye 4, pressed on and set. The parting plane surfaces of the connecting rod and the cap 9 are finish-ground and the whole is washed once again.

After this the cap 9 is tightened on the connecting rod with a specified torque and, if circumferential grooves 32 are provided, the grooves are introduced into the large eye, for example by milling or turning.

To facilitate later opening of the plasma coating 15 or 16, a rupture notch is made in the large connecting rod eye, for example by eroding laser cutting. This is followed by plasma coating of the large eye.

If necessary, depending upon the kind of connecting rod, an oil channel may be bored through the connecting rod from the large eye to the small eye. This may be done for gasoline engines and usually is done for diesel internal combustion engines.

The plasma layer 15 that has been deposited, which is often already cracked, depending upon plasma coating, due to the internal stress of the plasma layer 15 may be cracked by loosening of the cap bolts 10, The cap is removed and the area of rupture is cleaned, for example, by blowing. Then the cap 9 is reassembled and the bolts 10 are tightened with the appropriate torque. The large eye is chamfered on both sides and, if grooves are provided, the edges of the radial grooves are broken to round them off.

After this, the planar side surfaces 12 are finish-ground, the small eye 4 is finishbored, and the large eye 3 is finish-spindled to produce the actual bearing surface 35 and to expose micropores 33 on the surface of the bearing layer 16. After an additional wash operation, the connecting rods are measured and classified, during which preferably two tolerance classes are selected.

The connecting rods so produced are disassembled on the assembly line and then assembled onto the crankshaft 34 of an internal combustion engine.

After plasma coating of the large connecting rod eye and optionally boring of the oil channel, the large eye may be chamfered on both sides and, if grooves are provided, breaking of the radial groove edges may take place. This is then followed by finish-grinding of the plane surfaces, the small eye being finish-bored and the large eye finish-spindled. After washing and measuring and classifying the connecting rods, cracking of the plasma layer by loosening of the cap bolts then takes place, desirably directly on the assembly line. The connecting rod cap is removed and the rupture area is cleaned for example by blowing off. Then, the connecting rod is assembled onto the crankshaft of the internal combustion engine.

Advantageously, reversing of the orientation of the connecting rod cap is prevented, for example, by providing a slight displacement of the cap bolt bores, so that the serrations produced in the plasma layer upon cracking will match each other.

Production Sequence for Cracked Connecting Rod

The rough connecting rod for example of C 70 steel, is placed on the production line and rough ground, the side cheeks being ground plane. Pretreatment of the large and small connecting rod eyes and bolt hole processing for the bearing cap is effected by boring and thread-cutting. If desired, one or more circumferential grooves may be introduced into the large eye, for example by milling or turning depending upon the kind of bearing. Then the large connecting rod eye is notched, for example with an FK laser, which is driven through the eye at 45° with a laser power of approx. 7 kW to produce a notch of approx. 2 mm in width and 0.5 mm in depth centrally in the eye. The notch may alternatively be introduced by a broach or by eroding. The connecting rod eye is cracked by a breaking device with a breaking force of approx. 100 kN. The connecting rod bearing cap is removed and the rupture area cleaned, for example by compressed air. The connecting rod bearing cap is then reassembled and the cap bolts tightened with an appropriate torque. After that, the large connecting rod eye is plasma coated and a bearing bushing is pressed into the small eye. The large eye is chamfered on both sides, the connecting rod cheeks are finish-ground and the large and small eyes are fine-bored or fine-spindled. This is followed by thorough cleaning (washing) and measuring and classification of the connecting rod. The connecting rod is disassembled on the assembly line and assembled on the crankshaft of an internal combustion engine.

Cracking of the plasma layer, in particular by loosening of the connecting rod cap bolts, may be effected directly on the assembly line or alternatively at an earlier point in time. After cracking of the plasma layer, it is advisable to clean the connecting rod cap rupture area by blowing.

Production Sequence for Plasma Coating

The connecting rod is washed and at least the large eye is degreased with superheated steam and then dried to as low a residual moisture content as possible. A plurality of connecting rods such as four to eight rods, is stacked with the large eyes, concentric, on top of each other on a special pallet. Fixing of the connecting rods to the pallet may be effected through the small connecting rod eye or the side faces of the connecting rods. The loaded pallet is moved through a neutral zone into a sandblasting unit and positioned. The large connecting rod eye is sandblasted with the sand classifications described above to an average peak-to-valley height of approx. 6.5 $\mu$m to 8 $\mu$m. Then the pallet, with the sandblasted connecting rods, moves into a cleaning station in which the blasted surface is blown off or blown out with compressed air. The pallet moves on into the plasma station, in which the large eye is plasma coated first with a slightly porous and then with a somewhat more porous layer of aluminum bronze to a total thickness of 0.5 mm. The coated connecting rods move into a cooling zone and are taken from the pallet for subsequent processing after cooling.

The present invention has the advantage that large eye bearing shells and their assembly, as well as the holding grooves and the deburring therefor are eliminated. This increases the reliability of assembly. Plasma coating results in a greater web thickness, i.e., a smaller connecting rod eye diameter, in the region of the bearing cap fastening, since a bearing shell has a thickness of approx. 2.5 mm compared with a plasma layer of less than 0.5 mm. This permits a higher connecting rod loading in highly loaded engines and/or a reduction in weight of the connecting rod. In addition, a slot between two bearing shell halves, which due to the construction may in some cases lead to detachment of the oil film, is eliminated. Better lubricating properties are obtained by plasma coating. At the same time, tolerances are reduced, since one tolerance class is eliminated by plasma coating. Due to smaller manufacturing tolerances, this results in better running of the engine. The use of circumferential grooves in plasma coating allows a higher bearing load and a reduction of mixed friction time to be obtained. The micropressure chamber system, especially in combination with one or more grooves, reduces friction. The grooves may alternatively be coated with some other sliding bearing material, which, after machining of the coating, is present essentially only in the grooves. Such bearing materials may be based on lead, tin or alternatively nickel. This also makes higher bearing loads and/or service lives possible.

Although the invention has been described herein with reference to specific embodiments, many modifications and variations therein will readily occur to those skilled in the art. Accordingly, all such variations and modifications are included within the intended scope of the invention.

I claim:

1. A method for producing a connecting rod having a connecting rod eye with a bearing layer comprising depositing a bearing material on a connecting rod by thermal spraying a first bearing layer on the eye having a fist porosity and thermal spraying a second layer on the first layer having a porosity which is higher than the first porosity to produce a bearing layer having a bearing surface containing micropores and then removing the second layer to provide a finished bearing surface having the first porosity.

2. A method according to claim 1 wherein the surface of the bearing layer has a porosity in a range from 0.2% to 10%.

3. A method according to claim 2 wherein the surface of the bearing layer has a porosity in a range from 0.5% to 4%.

4. A method according to claim 1 wherein the micropores in the bearing surface are predominantly closed pores.

5. A method according to claim 1 further comprising forming at least one groove in the bearing layer.

6. A method for producing a connecting rod having a connecting rod eye with a being layer comprising depositing a bearing material on a connecting rod eye by thermal spraying a first bearing layer on the eye having a first porosity and thermal spraying a second layer on the first layer having a porosity which is higher than the first porosity to produce a bearing layer and forming at least one groove in the eye to provide a groove in the bearing layer and then removing the second layer to provide a finished bearing surface having the first porosity.

7. A method according to claim 5 or claim 6 including forming a plurality of grooves in the eye to provide a plurality of grooves in the bearing layer.

8. A method according to claim 5 or claim 6 including forming a groove having a V-shape or trapezoidal shape.

9. A method according to claim 8 wherein the groove has flanks extending at an angle in the range from 30° to 80°.

10. A method according to claim 9 wherein the groove has flanks extending at an angle in the range from 45° to 60°.

11. A method according to claim 5 or claim 6 wherein the groove has a depth in the range from 0.2 mm to 1 mm.

12. A method according to claim 11 wherein the groove has a depth in the range from 0.4 mm to 0.6 mm.

13. A method according to claim 5 wherein the groove is formed before thermal spraying.

14. A method according to claim 5 or claim 6 wherein the groove extends at least partially in a circumferential direction.

15. A method according to claim 14 wherein the groove is circumferentially closed.

16. A method according to claim 1 including the step of mechanically finishing the bearing layer.

17. A method according to claim 6 including finishing the bearing layer.

18. A method according to claim 1 or claim 8 comprising thermally spraying the bearing material by plasma spraying.

19. A method according to claim 1 or claim 6 comprising depositing a metal to produce the bearing layer.

20. A method according to claim 19 comprising depositing a metal alloy to produce the bearing layer.

21. A method according to claim 1 or claim 6 including finishing planar surfaces of the connecting rod after producing the bearing layer.

22. A method according to claim 1 or claim 6 including roughening the connecting rod eye before depositing the bearing material.

23. A method according to claim 22 including roughening the connecting rod eye by sandblasting.

24. A method according to claim 22 wherein the connecting rod eye is roughened to an average peak-to-valley height $R_a$ in the range from 4 μm to 30 μm.

25. A method according to claim 24 wherein the connecting rod eye is roughened to an average peak-to-valley height $R_a$ in the range from 6 μm to 12 μm.

26. A method according to claim 23 including roughening the connecting rod with a plurality of sandblasting steps using different grain sizes by using a fine grain size before using a coarser grain size.

27. A method according to claim 1 or claim 6 comprising assembling a plurality of connecting rods with their connecting rod eyes lying concentrically on top of one another and simultaneously depositing a bearing material on the connecting rod eyes by thermal spraying.

28. A method according to claim 1 or claim 6 wherein thermal spraying is carried out by moving a spray nozzle through the connecting rod eye at a rate in the range from 0.5 mm/s to 20 mm/s.

29. A method according to claim 28 wherein the nozzle is moved at a rate in the range from 2 mm/s to 8 mm/s.

30. A method according to claim 1 or claim 6 including depositing the bearing material in a plurality of layers and removing at least one of the layers to form the bearing surface.

31. A method according to claim 30 wherein the number of layers deposited is in the range from 4 to 30.

32. A method according to claim 1 or claim 6 wherein the deposited bearing material has a thickness in the range from 150 μm to 800 μm.

33. A method according to claim 32 wherein the deposited bearing material has a thickness in the range from 200 μm to 500 μm.

34. A method according to claim 1 or claim 6 including opening the connecting rod eye by notching and breaking.

35. A method according to claim 1 or claim 6 including blowing a gas stream with a flow velocity in the range from 3 m/s to 15 m/s through the connecting rod eye during thermal spraying.

36. A method according to claim 35 wherein the gas stream has a velocity in the range from 5 m/s to 10 m/s.

* * * * *